Oct. 17, 1961 G. MISSBACH 3,004,289
APPARATUS FOR THE CONTINUOUS MOULDING
OF THERMOPLASTIC MATERIALS
Filed Oct. 2, 1959 3 Sheets-Sheet 1

Inventor:
Günther Missbach

Oct. 17, 1961 G. MISSBACH 3,004,289
APPARATUS FOR THE CONTINUOUS MOULDING
OF THERMOPLASTIC MATERIALS
Filed Oct. 2, 1959 3 Sheets-Sheet 2

Inventor:
GÜNTHER MISSBACH
By:
Watson, Cole, Grindle, v Watson
Attorneys

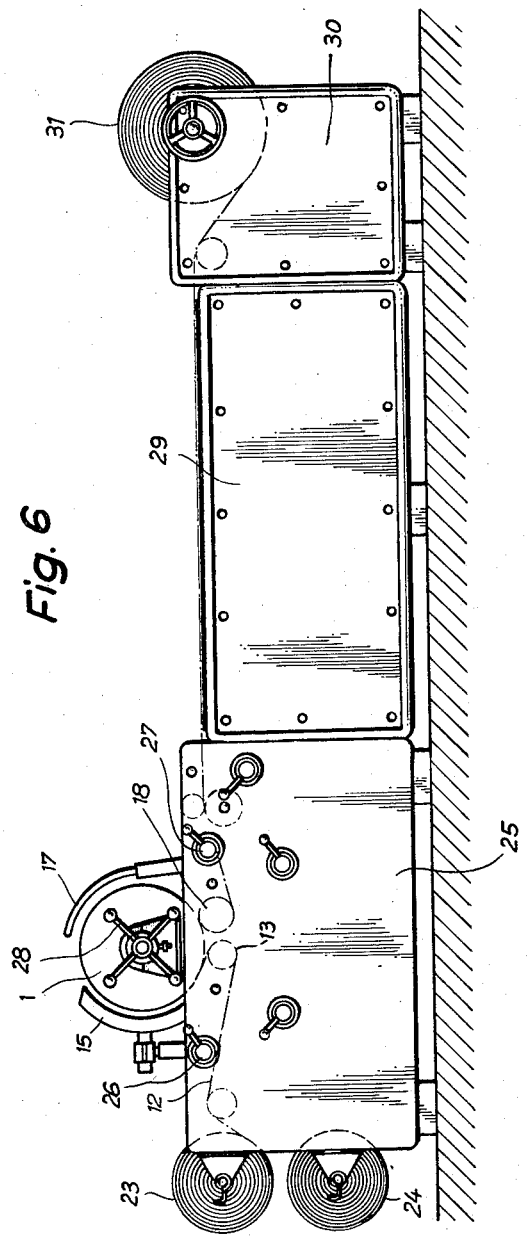

United States Patent Office 3,004,289
Patented Oct. 17, 1961

3,004,289
APPARATUS FOR THE CONTINUOUS MOULD-
ING OF THERMOPLASTIC MATERIALS
Günther Missbach, Munich, Germany, assignor to Firma
Alkett Maschinenbau G.m.b.H., Berlin-Borsigwalde,
Germany
Filed Oct. 2, 1959, Ser. No. 843,998
12 Claims. (Cl. 18—19)

The present invention relates to apparatus for the continuous moulding of thermoplastic materials by means of a rotating cylinder supporting the pattern against which the plastic sheet to be moulded is urged by the application of the vacuum deep drawing method to part of the periphery of said cylinder, means being provided to heat the plastic sheet within the neighbourhood of the pattern to the moulding temperature and to cool it again after moulding has been completed.

Apparatus of the kind described in outline is known. Thus, a continuously operating mechanism consisting of two cylinders which touch one another at their peripheries is for example described in the specification of U.S.A. Patent No. 2,387,747. Each of the individual cylinders is provided with moulding recesses approximately of hemispherical shape on its external surface. Both cylinders are supplied with gelatine foil which, shortly before it comes into contact with the cylinder, is heated to its plasticising temperature. The foil, which in this manner has been made plastic, is then caused to make close contact with the mould by the application of the vacuum deep drawing method. As the cylinder continues to rotate, the material, with which the hemi-spherical shells so formed are to be filled, is injected into them and this results in a package of approximately spherical shape which is then closed along its edges, and finally stamped out of the parent foil material.

In the case of this known machine, very complicated components, which in consequence are very expensive to manufacture, are necessary in order to maintain and control the vacuum on the appropriate part of the periphery of the cylinder which is required for the deep drawing operation. For this purpose a transverse passage extending across the whole width of the cylinder and communicating with each of the several moulds is provided for each set of moulds. Now in order to enable the total number of these transverse passages, which are necessary for the proper performance of this method, to be connected to the vacuum plant, for example a vacuum pump, one end face of each cylinder is fitted with a valve plate, which has to be very carefully machined and ground—in fact in the same way as the said end face of the cylinder—and which is in such close contact with the cylinder as to form an absolutely vacuum-tight seal. This valve plate contains a segment-shaped passage open towards the holes in the cylinder and in communication with the vacuum plant, which is so dimensioned that it overlaps the required number of cylinder holes.

It will thus be seen that a considerable amount of complicated design is necessary in order to control the application of the vacuum in the case of the known apparatus so that the units so constructed do not only involve high manufacturing costs but are also very vulnerable to faults in operation, since it is known to be very difficult to keep the valve plate vacuum-tight for any length of time.

According to the present invention these drawbacks are overcome or reduced by an arrangement in which the cylinder, which provides the support for the moulding pattern in the known manner, is hollow, and in which an auxiliary drum of smaller diameter is provided inside the said cylinder in such a manner that it is caused to rotate by the friction force exerted by the outer cylinder the clearance between the cylinder and drum being partly filled by an elastic medium which closes those of the above mentioned suction apertures in the outer cylinder which are not enveloped by the plastic sheet.

In other words, instead of the rigid metallic machined seal which has so far been employed in order to cover up those of the suction apertures which are not enveloped by the plastic sheet, a flexible sealing element is now used so that the necessary vacuum-tight seal is achieved without difficulty in the structurally simplest possible manner and for a greatly extended period of operating time. Furthermore it is significant that no precision finishing of the cylinder will any longer be necessary in the neighbourhood of the sealing surface, since the said flexible sealing element will adapt itself quite automatically to any contour of the surface of the cylinder.

Further details of the invention will now be explained by reference to embodiments of the invention for which protection is being sought as illustrated in the accompanying drawings in which:

FIG. 6 is a side elevation of a machine installation consisting of a cylinder assembly constructed in accordance with the invention, an intermediate table and a take-up mechanism for the finished product.

Figure 1:
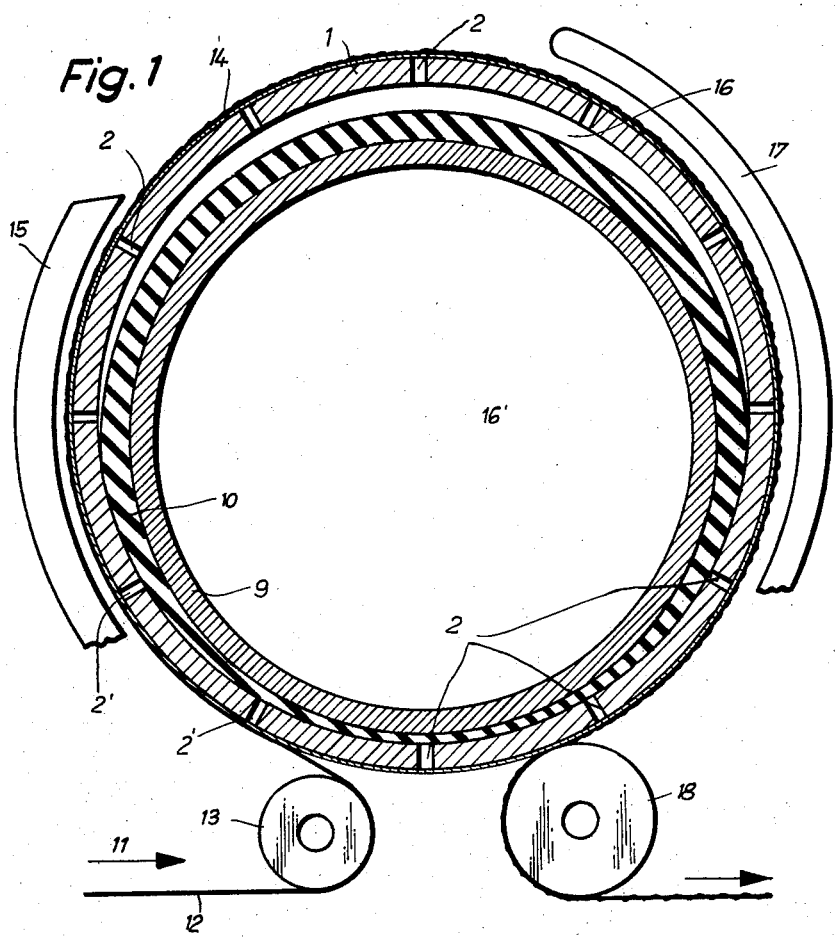
FIG. 1 shows diagrammatically in cross-section a first embodiment of a cylinder assembly constructed in accordance with the invention with the neighbouring components and the length of plastic sheet passing through the arrangement.
Figure 2:
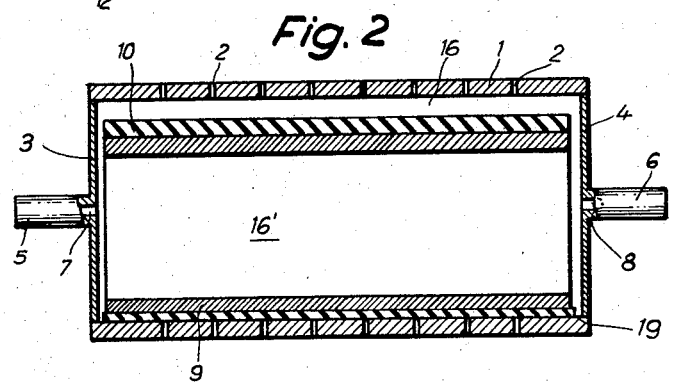
FIG. 2 is a longitudinal section through the cylinder assembly to a smaller scale than FIG. 1.

Referring to the drawings, in the embodiment according to FIGS. 1 and 2, the apparatus comprises a hollow outer cylinder 1 having suction apertures 2 distributed over its periphery. The cylinder is provided with a gastight closure on either side constituted by flanges 3, 4. Integral with these flanges are stub shafts 5, 6 which provide support for the cylinder and through which pass passages 7 and 8 connecting the inside of the cylinder with a vacuum plant (not shown on the drawing), for example, a container or receiver in communication with a vacuum pump. Within the cylinder 1 there is mounted eccentrically an auxiliary drum 9 of smaller diameter, the clearance between the cylinder and drum being partly filled by a flexible element 10 which might for example sit fast or loosely on the cylinder 9 or which might be vulcanized thereon. This element 10 will preferably be made of an appropriately temperature-resistant type of rubber, or a flexible plastic, or of foam rubber, or foam plastic. On the other hand the auxiliary drum 9 can, if necessary, also be made as a whole of a flexible material.

The length of plastic sheet 12 which is to be moulded and which travels in the direction of the arrow 11 (FIG. 1) is first fed over a guide roller 13 towards the cylinder 1 over which is stretched the pattern or the mould, for example an embroidered appropriately prepared tablecloth 14 of linen or like material. Immediately after the plastic sheet has begun to pass round the cylinder it comes within the range of a heater element 15 so that it becomes plastically soft whereby it is enabled to make close contact with the pattern 14—urged by the vacuum which is present in the crescent-shaped space 16 and the space 16'—assuming the surface contour of said pattern. Next, the length of sheet is cooled down again by a cooling appliance 17, so that it sets and finally it is passed over the guide rollers 18 towards the cutting table or a take-up reel.

In the example as drawn, the guide roller 18 is at the same time used as a friction pulley driving the cylinder 1 by means of an electric motor or like driving element, not shown on the drawing. Whilst the cylinder 1 is rotating, it carries the auxiliary drum 9 with it, due to the weight of the latter and the action of the flexible cover 10. In operation, the cover 10 closes the apertures in the cylinder 1 which are designated 2' at those points which are not closed by the length of plastic sheet 12. In this process the flexible cover 10 may, if necessary, project sideways (as indicated at point 19 in FIG. 2), since the external width of the inner drum 9 can readily be made less than the internal breadth of the cylinder 1.

Figure 3:
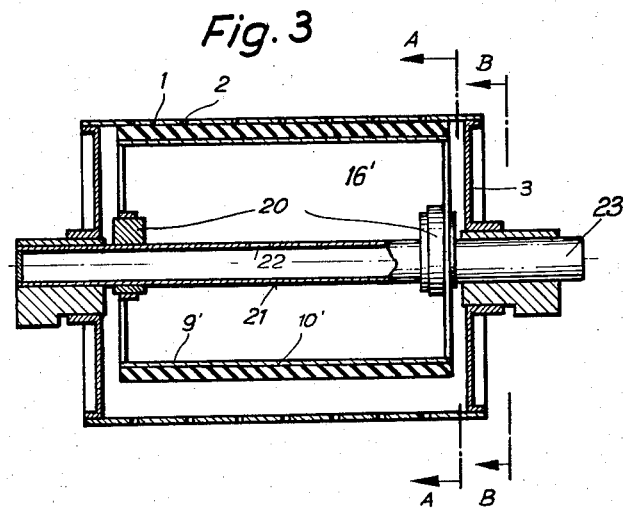
FIG. 3 is a longitudinal section through a second embodiment of the apparatus constructed according to the invention having an inner drum with variable contact pressure.
Figure 4:
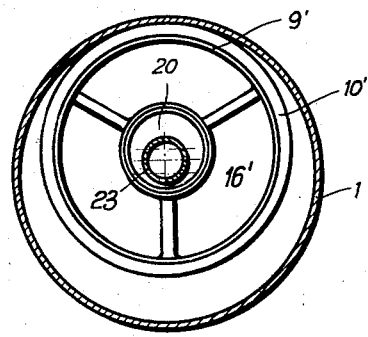
FIG. 4 is a cross section along the line A—A of FIG. 3.
Figure 5:
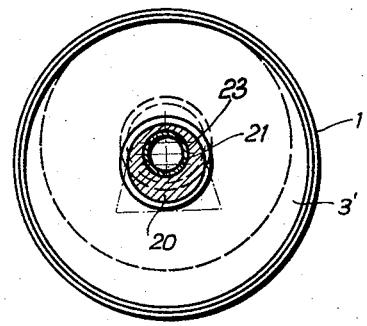
FIG. 5 is a cross section on the line B—B of FIG. 3.

In the embodiment constructed in accordance with FIGS. 3 to 5 the design of the apparatus is the same except that in this case the inner drum 9' can be adjusted with respect to the cylinder 1 by means of eccentric mountings 20. As a consequence it is possible to raise the inner drum clear of the outer cylinder, when the apparatus is not in use, together with the cover 10', thereby ensuring a particularly long working life for the cover 10'. In addition, it is possible to adjust the contact pressure of the inner drum within wide limits so that the cylinder assembly can also be used for work in which the inner drum is in contact with the external cylinder not at the bottom but at the top. In addition, in the example according to FIGS. 3 to 5 the inner drum is supported on a hollow shaft 23 which is in communication with a vacuum plant (not shown on the drawing) and which is connected to the inner space 16' inside the inner drum by means of apertures 22.

Finally, FIG. 6 shows a complete moulding plant incorporating a cylinder assembly constructed in accordance with the invention. It will be seen that the length of sheet is fed from the stock reels 23, 24, which are preferably provided with a braking mechanism, towards the moulding cylinder 1 in the manner already described. The cylinder 1 is supported in a box-shaped frame 25 which contains also the other components of the plant e.g. the vacuum pump, the vacuum receiver and similar parts, also the necessary control levers etc. The hand levers indicated at 26 and 27 control the position of the heater element 15 and the cooler element 17 respectively, whilst the pattern 14 and the sheet of plastic material are placed upon the cylinder. In this case the contact pressure of the inner drum is adjusted by means of an eccentric mechanism as shown in FIGS. 3 to 5 controlled by the handwheel 28.

The cylinder assembly is followed by a cutting or working table 29 on which the moulded product, for example the individual tablecloths, are separated from the rest of the sheet. If the finished product is required in the form of an endless roll of material, it is taken up on the reel 31.

Within the scope of the present invention this plant could also be so modified that in the place of one single cylinder assembly two of these are used which similarly to the arrangement disclosed by the U.S.A. Patent No. 2,387,747 are placed symmetrically with respect to each other and are driven in opposite senses of rotation. In this manner capsules for packing purposes could for example be manufactured, one half of each such capsule being produced from one length of plastic sheeting on either of these cylinders. These moulded halves could then be welded together in one continuous operation by an electrical appliance; if necessary they could also be filled at the same time, and cut out of the length of sheet.

A technically very interesting field of application of the invention is finally the cementing together of different materials, using the atmospheric pressure which obtains everywhere around the vacuum cylinder 1.

For whereas in the known appliances the pressure required to cement the materials together can only be applied discontinuously, i.e. in separate steps, to larger areas and whereas mutual pressure between two rollers can only be maintained for a short time, viz. while line contact exists between them, the arrangement according to the invention offers the advantage of allowing pressure to be applied to the two materials which are to be cemented together during their passage round the cylinder over a large part of the periphery of the latter.

It is also possible to accelerate the cementing process by the application of heat. For example, if plastic material has to be cemented onto a textile fabric, the textile fabric would be placed in contact with the cylinder wall so that the sheet of plastic which is to be cemented onto the fabric would be sucked against it through the pores in the fabric. In this manner it is for example possible to cement plastic onto textile fabric, plastic onto paper, paper onto plastic, paper onto textile fabric and so on.

I claim:
1. Apparatus for the continuous molding of thermoplastic materials, comprising a rotating cylinder having a plurality of apertures therein and connected to a vacuum plant and to support a pattern against which a plastic sheet to be moulded is urged by the vacuum induced suction applied to a part of the periphery of said cylinder, means to heat the plastic sheet within the neighborhood of the pattern to the moulding temperature, means to cool the material and pattern after moulding has been completed, said cylinder being hollow, a drum in the hollow of the cylinder and which is of smaller diameter than the cylinder, means to cause rotation of the drum by frictional engagement with the outer cylinder, and an elastic medium partially filling the clearance between the cylinder and the drum to keep the suction apertures in the outer cylinder closed which are not enveloped by the plastic sheet.

2. Apparatus according to claim 1, in which the drum is made of a flexible material.

3. Apparatus according to claim 1, in which a flexible sleeve is provided around and enclosing the drum and is composed of a flexible plastic material.

4. Apparatus according to claim 1, in which a flexible sleeve is provided around and enclosing the drum and is composed of a foam-like plastic material.

5. Apparatus according to claim 1, in which said elastic medium enclosing the drum is vulcanized onto the latter.

6. Apparatus according to claim 1, in which means are provided for adjusting the contact pressure between the drum and the rotating cylinder.

7. Apparatus according to claim 1, in which means are provided to mount the drum eccentrically with respect to the cylinder and said mounting being adjustable.

8. Apparatus according to claim 1, in which the width of the drum is less than the inner breadth of the cylinder.

9. Apparatus according to claim 1, in which a friction pulley is provided to drive the cylinder.

10. Apparatus according to claim 1, in which a friction pulley and a guide pulley are provided with the friction pulley driving the cylinder and also guiding the plastic sheet with the guide roller.

11. Apparatus according to claim 1, in which a friction pulley and a guide pulley are provided with the friction pulley driving the cylinder and also guiding the plastic sheet with the guide roller, and the friction material covering the entire width of the guide roller.

12. Apparatus according to claim 1, in which two symmetrically mounted outer cylinders are provided driven in opposite directions and arranged so that the moulded product leaving one of said cylinders is complementary to that leaving the other cylinder.

(References on following page)

References Cited in the file of this patent

UNITED STATES PATENTS

| | | |
|---|---|---|
| 1,909,228 | Sizer | May 16, 1933 |
| 2,387,747 | Cowley | Oct. 30, 1945 |
| 2,490,781 | Cloud | Dec. 13, 1949 |
| 2,520,337 | Roberts | Aug. 29, 1950 |
| 2,558,693 | Roubal | June 26, 1951 |
| 2,776,451 | Chavannes | Jan. 8, 1957 |
| 2,776,452 | Chavannes | Jan. 8, 1957 |